(12) United States Patent
Gubych

(10) Patent No.: US 7,589,129 B2
(45) Date of Patent: Sep. 15, 2009

(54) METHOD OF MODIFYING POLYACRYLATES FOR OBTAINING HIGH MOLECULAR POLYMERS

(75) Inventor: Igor Gubych, Lviv (UA)

(73) Assignee: Waltech, AG, Ruggell (LI)

( * ) Notice: Subject to any disclaimer, the term of this patent is extended or adjusted under 35 U.S.C. 154(b) by 356 days.

(21) Appl. No.: 10/590,263

(22) PCT Filed: Feb. 11, 2005

(86) PCT No.: PCT/EP2005/001367

§ 371 (c)(1),
(2), (4) Date: Aug. 18, 2006

(87) PCT Pub. No.: WO2005/080447

PCT Pub. Date: Sep. 1, 2005

(65) Prior Publication Data

US 2007/0179212 A1    Aug. 2, 2007

(30) Foreign Application Priority Data

Feb. 19, 2004 (EP) .................................. 04405095

(51) Int. Cl.
*C08F 20/10* (2006.01)
*C08F 2/10* (2006.01)
*C08F 2/46* (2006.01)

(52) U.S. Cl. .............................. 522/60; 522/61; 522/66; 522/67; 522/86; 522/153; 526/328; 524/832; 524/833; 521/31

(58) Field of Classification Search ................... 522/86, 522/84, 60, 61, 66, 67, 49, 153; 525/330.6, 525/359.3, 360; 524/832, 833; 521/31; 526/328
See application file for complete search history.

(56) References Cited

U.S. PATENT DOCUMENTS

| 3,811,902 | A |   | 5/1974 | Podlas |         |
|-----------|---|---|--------|--------|---------|
| 5,629,377 | A | * | 5/1997 | Burgert et al. | 524/832 |
| 7,205,369 | B2 | * | 4/2007 | Song | 526/295 |
| 7,285,599 | B2 | * | 10/2007 | Mertens et al. | 525/360 |

FOREIGN PATENT DOCUMENTS

| EP | 0 541 201 | 5/1993 |
|----|-----------|--------|
| JP | 63230704  | 9/1988 |

* cited by examiner

*Primary Examiner*—Susan W Berman
(74) *Attorney, Agent, or Firm*—Morriss O'Bryant Compagni, P.C.

(57) ABSTRACT

The present invention relates to the field of acrylic polymers and in particular to their modification with the purpose of the formation of compounds of still higher molecular masses. Plastic materials of the type of acrylic universal polymer (PAU), e.g. sold under the tradename "POLYGOR", can be used as starting material. The acrylic starting material is then modified by appropriate modifier compounds. In this way modified polymers can have molecular weights in the range between $2 \times 10^5$ and $15 \times 10^7$ a.u. and are water-soluble. This allows to use them as flocculation, coagulation, ion-exchange means and as additives to surface active agents for raising their washing and foaming capabilities.

30 Claims, No Drawings

METHOD OF MODIFYING POLYACRYLATES FOR OBTAINING HIGH MOLECULAR POLYMERS

This application claims priority to International Application PCT/EP2005/001367 filed Feb. 11, 2005 and European Patent Application No. EP 04405095.3 filed on Feb. 19, 2004.

TECHNICAL FIELD

The present invention relates to the field of acrylic polymers and in particular to the modification of polyacrylates for obtaining high-molecular plastic materials.

PRIOR ART

Polymers of acrylic and metacrylic acids and their derivatives can be obtained in a known manner both by radical and by ion reaction mechanisms: block polymerisation, emulsion polymerization, suspension polymerisation and polymerisation in solutions. According to custom in the industry radical polymerisation mechanisms are used in block, suspension and emulsion polymerisation, where benzoil peroxide is used as initiator for starting the polymerisation reaction. For the polymerization in an aqueous emulsion one can also use hydrogen peroxide, ammonium peroxysulphate and other initiators soluble in water and oxidizing-reduction systems, which are conductive to free radicals formation. In aqueous solutions acrylic and metacrylic acids are polymerized in the presence of oxygen, peroxide compounds or peroxysulphates.

Polymers, which had been obtained in the past by block polymerization methods, have usually molecular masses smaller than $2\times10^5$ atomic units (a.u.). In materials the molecular masses are usually within the limits of $0.4\times10^5$-$2\times10^5$ a.u.

The modification of already polymerized compounds is one of the most important methods for the production of polymers with new valuable properties. The modification can take place, both, without substantial change of the molecular mass and structure of the polymers and also with considerable change of their chemical structure and molecular mass. In the first case it is the reaction of polymeranalogic transformation, and in the second case block- and grafted co-polymerization of polymers.

Equally, chemical modification reactions can be used for giving to polymers acidic or alkaline properties by means of corresponding functional groups introduction.

The substitution of hydrogen atoms in polyethylene and in other polymers by chlorine atoms is widely used for the production of chlorinated polymers. Often the chlorination process is combined with the simultaneous action of sulphur dioxide ($SO_2$). By such a process sulphur-chlorinated polymers are generated.

Also widely used is the substitution of hydrogen atoms in benzene rings by amino groups for the synthesis of ion exchanger polymers—ionits. The sulphurization of polystyrene leads to another known generation of polymer ion exchangers. Such ion exchangers contain sulphogroups in the benzene ring.

Another important method for polymer modification is the block- and grafted co-polymerization. In the first case identical or different polymer molecules react with each other, i.e. are sewed (linked) together to form molecules with new properties. In the second case the polymers are branched to form new macromolecules.

The most widespread methods of block- and grafted copolymer formation are based on the interaction of macromolecular initiators with monomers (method I) or macroradicals and polymers with each other (method II).

The first method (I) uses polymers as macromolecular initiators, which have or create active centers at the ends or in the middle of the polymer chain during the polymerization process. The active centers in the macromolecule can be obtained by the following methods: (a) interaction of polymers with radicals, (b) introduction of peroxide groups or (c) irradiation of polymers and creation of radicals or ionized compounds. The shortcoming of the aforementioned methods is the simultaneous formation of grafted and homo-polymers which can be separated only with difficulty.

The second method (II) of block- and grafted copolymers formation is based on condensation reactions or polymer recombination, which contain appropriate functional groups. If the functional groups are placed at the end of the polymeric chain, then block-copolymers are generated, and if they are contained in the middle of the molecule—grafted polymers are formed.

Polyacrylates acting as so-called superabsorbents are linked together by transversal chemical links. These superabsorbents are characterized by hydrophilic properties and are capable to adsorb considerable volumes of water to form a gel-like state without being dissolved in water. The insolubility of such gels is due to the fact that a gel is a macromolecular net in which the separate chains are connected between themselves with chemical links. The interconnected chains, however, do not allow solvent molecules to divide macromolecules between themselves, as their division or separation would be equivalent to polymer break-down.

The ozonization reaction of polymers permits to engraft synthetic polymers to the natural polymers (such as cellulose, starch and the like). Said reaction can be considered as the most similar technological solution to the one of the present vinvention. For example, with the help of ozonization processes grafted copolymers of polyacrylnitril and cellulose, starch, polystyrene et al. can be obtained (Shur A. M. High-molecular compounds.—Moscow.: Higher school, 1966. P. 179-180).

The conventional polymerization methods have the following characteristics:

TABLE 1

| Principal polymerization methods | |
|---|---|
| block polymerization | absence of solvent, monomer is the reaction medium |
| solution polymerization | initial monomer is soluble in the solvent |
| suspension polymerization | initiator molecule is soluble in the monomer |
| emulsion polymerization | presence of emulsifier |

OBJECT OF THE INVENTION

It is an objection of the present invention to provide high-molecular polymers, in particular acrylic high-molecular polymers. A further object is to provide acrylic high-molecular polymers, which are at least partially soluble in water. A further object of the present invention is the provision of a method to allow the production of high-molecular polymers in industrial scales. A still further object of the present invention is the transformation of a gel-forming water insoluble acrylic polymer to a water soluble acrylic polymer.

DESCRIPTION

According to the invention the above objects can be achieved by a method of forming high-molecular polymers starting from gel-forming water-insoluble polymers, in particular polymers of the acrylic type, including the steps of:
a) dissolving an amount of at least one initiator-modifier compound in an aqueous solution at a starting temperature;
b) adding a gel-forming water insoluble polymer to the solution and mixing it therewith to form macro-aggregates from the polymers; and finally
c) modifying the macroaggregates by heating or by irradiation to form water-soluble high-molecular polymers. It is believed that the in-situ generation of atomic oxygen is responsible for the formation of peroxide links (—O—O—) between polymer molecules. These peroxide links are destructed in a further step at elevated temperatures or by irradiation resulting in the formation of water soluble high molecular polymers.

Preferably, for the modification of the macro-aggregates the temperature of the solution is increased steadily or in intervals from the starting temperature to an elevated aging temperature for a pre-determined time period. The inventive method offers the following advantages: The high-molecular polymers derived from acrylic acid (of the type of acrylic universal polymer "POLYGOR") can have molecular masses of between $0.2 \times 10^5 - 15 \times 10^6$ a.u., that is one order of magnitude higher than the molecular mass of polymers, which are synthesized in the industry by well-known methods. Further, the acrylic acid polymers modified according to the invention are water-soluble in contrast to transversely sewn together hydrophilic superabsorbents on the base of acrylic acid (such as SAP, FAWOR, SA, SX et al.), which form insoluble gels with water.

The inventive method is in so far different to known poylmerization methods (see table 1 above) as in the process of sorption of water and swelling the starting material, i.e. superabsorbents on the basis of acrylic polymers, forms a gel-like mass without being dissolved and its modification is provoked by the use of water-soluble initiator-modifier compounds.

The inventors have found that commercially available so-called acrylic superabsorbents can be used as initial raw material (hydrophilic superabsorbents such as SAP, FAWOR, SA, SX et al.) and that the block-copolymerization method can be applied for the synthesis of high-molecular polymers.

To the surprise of the inventors it has been found that cross-linked polyacrylates can be used as initial polymers for the synthesis of compounds of still higher molecular mass. It appears that the mobility of the generated macroradicals, which are represented by polymeric chains, is essentially controlled by intermolecular chemical links. The intermolecular links intensify the "gelating-effect" and promote an increase of the resulting molecular mass in the block co-polymerization process.

The choice of the modifier compound is determined by the chemical nature of the polyacrylates, for which oxygen and peroxide compounds are polymerization initiators in aqueous solutions.

Although the exact principle of the polymerization reaction is not known yet, it is assumed that the process is initiated by the formation of macro-radicals by means of hydrogen elimination from transversely sewn together polymeric chains.

The reaction mechanism for forming macroradicals (R*) under the action of oxygen is presumably as follows:

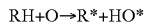

"Active oxygen", that is atomic oxygen, is released or generated (given off) in the process of the destruction of peroxide, peroxi-compounds and other compounds releasing active oxygen upon destruction.

It is suggested to use oxygen-containing halogen compounds of the general formula $EHaO$, $EHaO_2$, $EHaO_3$, $EHaO_4$ (E-H, Na, K; Ha-halogens), $CaOCl_2$ and also ozone, peroxide compounds ($E_2O_2$), ammonium peroxysulphate for obtaining active oxygen which results in modification of sewn together polymers.

The modification reaction can be also initiated or conducted by means of the admission of gaseous chlorine into an alkaline reaction mixture with the purpose of generating in-situ oxygen-containing compounds of the type EHaO:

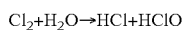

The proposed process differs from conventional chlorination reactions in the course of polymeranalogic transformation in that, in case of the presence of chloroxygen-containing compounds, the main role in the modification process is played by oxygen, not by chlorine as according to the present invention.

It should be noted that the synthesis of high-molecular polymers according to the invention can take place more intensively and faster under the action of daylight or UV irradiation and heating, as far as they accelerate the disintegration of hypochlorite according to reaction:

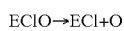

According to the described inventive solution hydrogen elimination results in the generation of active centers (radicals) at the ends of cross-linked polymer chains. Additionally, active centers are obtained also in the process of the mechanical destruction of polymers.

As a result of the interaction of active centers chemical links are formed between macromolecules and polymeric macroaggregates.

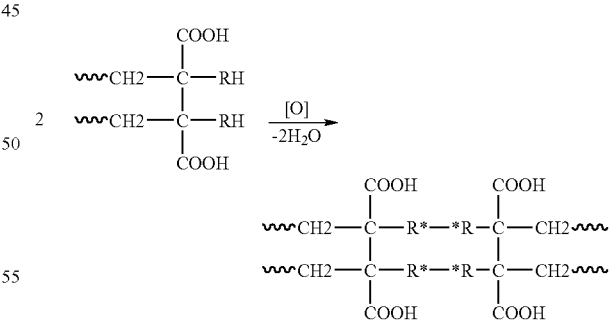

Sewn together polymeric chains in macroaggregates are characterized by much higher molecular masses than the initial polymers, so far as their length has considerably grown as a result of the block-co-polymerization process.

The subsequent destruction of (transversal) chemical links between high-molecular polymeric chains is the next step in the modification process of cross-linked polyacrylates. The following kinds of destruction are used to this end: thermal, photochemical, penetrating radiation treatment (γ- or -X-ray radiation). If there is considerable excess of initiator-modifier, oxygen formation causes also destruction of polymer by oxidation.

As a result of the destruction of transversal chemical links high-molecular linear polymers are obtained, which are capable to dissolve in water or aqueous solutions.

Preferably, the method further comprises the step of adding a reducing agent to the solution for the removal of excess initiator-modifier compound. By the removal of excess initiator-modifier compound the polymerization process can be stopped and the resulting molecular weight controlled.

Preferably, the initiator-modifier compound is of the general formula $EHaO$, $EHaO_2$, $EHaO_3$ or $EHaO_4$ wherein E is hydrogen or an alkali metal or alkali earth metal and Ha is halogen. These compounds have been found efficacious for starting the polymerization process. More precisely, the initiator-modifier compound is one of $CaOCl_2$, ozone, peroxide compounds ($E_2O_2$) and/or ammonium peroxysulphate. The initiator-modifier compound can be generated also 'in situ' by adding precursor compounds or educts for forming 'in situ' substances of the general formula $EHaO$, $EHaO_2$, $EHaO_3$ or $EHaO_4$ wherein E is hydrogen or an alkali metal or alkali earth metal and Ha is halogen.

Preferably, the pH of the reaction solution is kept between 7 and 14 during the polymerization reaction. It has been observed that the polymerization velocity decreases sharply at a pH of 6 to 7. The concentration of the initiator-modifier compound can be determined according to 'active oxygen'. Preferably, the concentration (by weight of the initiator-modifier compound is between 0.05-20.0% of the polymer mass to be modified. Good results can be obtained when the concentration of the initiator-modifier compound is between 0.1 and 10%, preferably between 0.3 and 5%, and most preferably between 0.5 and 1.0% of the polymer mass to be modified.

It is feasible to add the polymer to the reaction solution in a granulated form or as a suspension. Preferably, the granulate is composed of particles with a mean diameter of maximum 400 μm, preferably maximum 200 μm, and most preferably maximum 150 μm. The amount of the alkaline compound for forming the alkaline solution is less than 10% per weight, preferably less than 2% and most preferably less than 1% per weight.

It is preferred that the adding of the polymer is accomplished in a short time period, e.g. within 20 minutes, preferably within 15 minutes and most preferably within 10 minutes. The dissolution of the initiator-modifier compound can occur in a temperature range between 0 and 50° C., preferably 10 and 40° C., and most preferably between 15 and 25° C.

According to a preferred variant of the invention the polymers to be modified are hydrophilic superabsorbents, preferably derived from acrylic compounds like acrylic acid or its salts. The superabsorbents used as starting material preferably have a mean molecular weight of maximum $2*10^5$ a.u., preferably maximum $2*10^5$ a.u. and most preferably maximum $6*10^4$ a.u.

Preferably, the reaction mixture is aged at an aging temperature of 20 to 50° C. for for more than 1 hour, preferably more than 3 hours and most preferably more 10 hours. Preferred aging time periods vary between 1 and 20 hours, preferably between 3 and 15 hours, and most preferably between 5 and 10 hours. It has been found that the longer the aging process the better the result is. By the irradiation of the reaction mixture by electromagnetic radiation, preferably daylight, UV-light, penetrating (γ) and/or X-ray radiation the polymerization process can be accelerated. It is preferred that the reaction mixture is agitated or stirred vigorously during and after the addition of the gel-forming water insoluble polymer.

According to an another aspect of the invention object of the present invention are also high molecular mass acrylic polymers obtainable according to one of the claims 1 to 20. The novel polymeric material is characterized in that the average molecular weight is between $0.2×10^6$ and $15×10^6$ a.u.

General Process for the Production of High Molecular Mass Acrylic Compounds

For conducting the modification process known reactors of ordinary type made of stainless steel or enameled can be used. The reactors are equipped with a mixer (150-300 rpm) and heat transfer means, e.g. tubes, in which a heat transfer medium is circulated.

First the reactor is filled with water and an alkaline compound, preferably an alkali salt, is added and thoroughly mixed. The pH of the reaction mixture is controlled such that the pH is preferably within 7 and 14. The maximum amount of alkali added to the reaction mixture should, however, not exceed 10% per weight (table).

After the dissolution of the alkali compound the proper quantity of initiator-modifier is loaded. Preferred initiator-modifier compounds are oxygen-containing halogen compounds of the general formula $EHaO$, $EHaO_2$, $EHaO_3$, $EHaO_4$ wherein E is H, Na or K; and Ha is a halogen, $CaOCl_2$, Ozone, peroxide compounds of the general formula $E_2O_2$, wherein E is H, Na or K, or ammonium peroxysulphate. The reaction mixture is homogenized during approximately 5 to 10 minutes at ambient temperatures between 15-25° C.

The concentration of the initiator-modifier compound is determined on the basis of active oxygen, i.e. atomic oxygen. The concentration of active oxygen can vary between 0.05-20.0% per weight of the polymer mass to be modified. The optimum contents of active oxygen lies in the range between 0.5-1%. The amount of initiator-modifier compound has essential influence on the resulting molecular mass of the modified polymer: the higher the content of the modificator the smaller the molecular mass of the modified polymers.

The educt polymer is loaded into the reactor and the reaction mixture is stirred at 250-300 rpm. If necessary the polymer can be mechanically granulated beforehand. Preferably, the granulate has a particle size of <200 μm. Transversely sewn together polyacrylates acting as hydrophilic superabsorbents on the base of acrylic acid (such as SAP, FAWOR, SA, SX et al.) are used as the starting polymers. These compounds are commercially available and produced by companies like Dow Chemical, BASF, Stockhausen, Nippon Shokubai, Sumitomo Saika, Sun-Dia Polymers et al. These superabsorbents form insoluble gels with water.

It is preferred that the polymer is added to the reaction mixture within a short time interval, which should not exceed 3-5 minutes at a temperature 15-25° C. considering the rapid swelling of the polymer gelling in the solution. After the homogenization of the reaction mixture and the formation of the gel the stirring is stopped.

The amount of starting polymer added to the reaction mixture depends on the following factors: hydrophilic nature of the initial substance and time of its swelling (formation of insoluble gel), envisaged molecular mass of the modified product and consequently the considerable viscosity of the final polyacrylate. Preferably, the concentration of the polymer in the reaction mixture varies within 0.1-50.0%. Preferably, the concentration of the polymer in the reaction mixture is in the range between 5 and 10%, the optimum concentration being about 7%.

The gel-like mass is then aged in the reactor at a temperature between 20 and 50° C. during 5-10 hours. After the aging process the temperature is increased gradually and kept at about 100 to 130° C. for 5 to 10 hours.

The reaction process can be accelerated by daylight and ultraviolet light, penetrating (γ) and X-ray radiation. Electromagnetic radiation will promote the formation of macroradicals and thus also accelerates the modification reaction of cross-linked polyacrylates.

Upon the partial transition of gel-like mass into a plastic state the mixing of the reaction is started (at about 100-150 rpm) thereby producing a reaction mass with a homogeneous consistency. Remaining amount of initiator-modifier are removed, adding proper quantity of $Na_2SO_3$.

TABLE

Average ratio of reaction mass in the process of polymers modification.

| No | Component | Contents, % |
|---|---|---|
| 1 | Initial polymer (hydrophilic superabsorbents such as SAP, FAWOR, SA, SX et al.) | 0.1-50.0 |
| 2 | Initiator-modifier ("active oxygen") | 0.05-20.0* |
| 3 | Hydroxide of alkaline metal | 0-10 |
| 4 | Water | Excess |

*contents of active oxygen in % of quantity of initial polymer.

After the completion of the modification process the aqueous polymer solution is dried. If an aqueous polymer solution of a smaller pH value than that of the reaction mixtures is to be obtained, the alkaline solution is neutralized by the addition of a suitable acid (e.g. HCl, 1:1).

By the above described process polymers of the type of acrylic universal polymer "POLYGOR" with molecular masses between about $2 \times 10^6$ and about $15 \times 10^6$ atomic units can be obtained. The resulting polymers are characterized by a number of valuable properties. They can be used as flocculants, coagulants, ion-exchangers, gelating agents and also as additives to surface active agents for raising their washing and foaming capabilities.

EXAMPLE 1

| No | Component | Contents, % |
|---|---|---|
| 1 | Initial polymer FAWOR SXM 9145 (produced by companies like the German firm Stockhausen) | 7.0 |
| 2 | Active oxygen (initiator-modifier $CaOCl_2$) | 1.3* |
| 3 | Hydroxide of alkaline metal | 1.0 |
| 4 | Water | excess |
| 5 | Molecular mass of the acrylic universal polymer (PAU) "POLYGOR", a.u. | $3.9 \times 10^6$ |

*contents of active oxygen in % of quantity of initial polymer.

EXAMPLE 2

| No | Component | Contents, % |
|---|---|---|
| 1 | Initial polymer FAWOR SXM 9145 | 7.0 |
| 2 | Active oxygen (initiator-modifier NaOCl) | 1.0* |
| 3 | Hydroxide of alkaline metal | 1.0 |
| 4 | Water | excess |
| 5 | Molecular mass of the PAU "POLYGOR", a.u. | $5.1 \times 10^6$ |

*contents of active oxygen in % of quantity of initial polymer.

EXAMPLE 3

| No | Component | Contents, % |
|---|---|---|
| 1 | Initial polymer FAWOR SXM 9145 | 7.0 |
| 2 | Active oxygen (initiator-modifier NaOCl) | 0.5* |
| 3 | Hydroxide of alkaline metal | 1.0 |
| 4 | Water | excess |
| 5 | Molecular mass of the PAU "POLYGOR", a.u. | $7.8 \times 10^6$ |

*contents of active oxygen in % of quantity of initial polymer.

EXAMPLE 4

| No | Component | Contents, % |
|---|---|---|
| 1 | Initial polymer FAWOR SXM 9145 | 7.0 |
| 2 | Active oxygen (initiator-modifier NaOCl) | 0.25* |
| 3 | Hydroxide of alkaline metal | 1.0 |
| 4 | Water | excess |
| 5 | Molecular mass of the PAU "POLYGOR", a.u. | $10.9 \times 10^6$ |

*contents of active oxygen in % of quantity of initial polymer.

EXAMPLE 5

| No | Component | Contents, % |
|---|---|---|
| 1 | Initial polymer FAWOR SXM 9145 | 7.0 |
| 2 | Active oxygen (initiator-modifier $H_2O_2$) | 1.5* |
| 3 | Hydroxide of alkaline metal | 1.0 |
| 4 | Water | excess |
| 5 | Molecular mass of the PAU "POLYGOR", a.u. | $7.1 \times 10^6$ |

*contents of active oxygen in % of quantity of initial polymer.

EXAMPLE 6

| No | Component | Contents, % |
|---|---|---|
| 1 | Initial polymer FAWOR SXM 9145 | 7.0 |
| 2 | Active oxygen (initiator-modifier $H_2O_2$) | 0.75* |
| 3 | Hydroxide of alkaline metal | 1.0 |
| 4 | Water | excess |
| 5 | Molecular mass of the PAU "POLYGOR", a.u. | $12.2 \times 10^6$ |

*contents of active oxygen in % of quantity of initial polymer.

EXAMPLE 7

| No | Component | Contents, % |
|---|---|---|
| 1 | Initial polymer FAWOR SXM 9145 | 7.0 |
| 2 | Active oxygen (initiator-modifier $Na_2O_2$) | 1.0* |
| 3 | Hydroxide of alkaline metal | 1.0 |
| 4 | Water | excess |
| 5 | Molecular mass of the PAU "POLYGOR", a.u. | $6.8 \times 10^6$ |

*contents of active oxygen in % of quantity of initial polymer.

EXAMPLE 8

| No | Component | Contents, % |
|---|---|---|
| 1 | Initial polymer FAWOR SXM 9145 | 7.0 |
| 2 | Active oxygen (initiator-modifier $Na_2O_2$) | 0.5* |
| 3 | Hydroxide of alkaline metal | 1.0 |
| 4 | Water | excess |
| 5 | Molecular mass of the PAU "POLYGOR", a.u. | $10.2 \times 10^6$ |

*contents of active oxygen in % of quantity of initial polymer.

The invention claimed is:

1. A method of forming high-molecular polymers starting from gel-forming water-insoluble polymers, comprising the steps of:
   dissolving an amount of at least one initiator-modifier compound of the formula of one of EHaO, $EHaO_2$, $EHaO_3$ or $EHaO_4$, wherein E consists of one of hydrogen, an alkali metal or an alkali earth metal and Ha consists of halogen, in an aqueous solution at a starting temperature to form a reaction mixture;
   adding a gel-forming water insoluble polymer to the reaction mixture and mixing it therewith to form macro-aggregates from the water insoluble polymer; and
   modifying the macro-aggregates by at least one of heating and irradiation to form a water-soluble high-molecular polymer.

2. The method of claim 1, wherein modification of the macro-aggregates by heating further comprises increasing the temperature of the reaction mixture steadily or in intervals from the starting temperature to an elevated aging temperature for a pre-determined time period.

3. The method of claim 1, further comprising the step of adding a reducing agent to the reaction mixture for the removal of excess initiator-modifier compound.

4. The method of claim 1, further comprising selecting the initiator-modifier compound from the group consisting of at least one of $CaOCl_2$, ozone, peroxide compounds and ammonium peroxysulphate.

5. The method of claim 1, further comprising generating the initiator-modifier compound 'in situ' by adding at least one precursor compound for forming 'in situ' substances of the formula of one of the group consisting of EHaO, $EhaO_2$, $EhaO_3$ or $EhaO_4$ wherein:
   E consists of at least one of hydrogen, an alkali metal or an alkali earth metal; and
   Ha consists of a halogen.

6. The method of claim 1, further comprising determining the concentration of the initiator-modifier compound according to a concentration of active oxygen.

7. The method of claim 6, further comprising preparing the concentration of the initiator-modifier compound to be between 0.05 and 20.0% of a polymer mass to be modified.

8. The method of claim 6, further comprising preparing the concentration of the initiator-modifier compound to be between one of 0.1 and 10%, 0.3 and 5%, and 0.5 and 1.0% of the polymer mass to be modified.

9. The method of claim 1 further comprising adding the water insoluble polymer in solid form.

10. The method of claim 9, further comprising adding the water insoluble polymer to the reaction mixture in a granulated form.

11. The method of claim 10, further comprising selecting the water insoluble polymer from polymers composed of particles with a mean diameter maximum of one of 400 µm, 200 µm, and 150 µm.

12. The method of claim 1, wherein said dissolving an amount of at least one initiator-modifier compound comprises dissolving an alkaline compound in the aqueous solution for forming an alkaline solution wherein the alkaline compound is less than 10% per weight of the reaction mixture.

13. The method of claim 1 further comprising dissolving the initiator-modifier compound in a temperature range between 0 and 50° C.

14. The method of claim 1, further comprising adding the water insoluble polymer within 20 minutes.

15. The method of claim 1, wherein the water insoluble polymer to be modified is selected from a hydrophilic superabsorbent polymer that is a copolymer of acrylic acid.

16. The method of claim 1, further comprising selecting the amount of water insoluble polymer in the reaction mixture to be between 0.1% and 50.0% of a weight of the reaction mixture.

17. The method of claim 1 further comprising maintaining the pH of the reaction mixture between 5 and 14.

18. The method of claim 1, further comprising aging the reaction mixture at a temperature of 20 to 50° C. for at least 1 hour.

19. The method of claim 1 further comprising irradiating the reaction mixture by electromagnetic radiation consisting of at least one of daylight, UV-light, penetrating (γ) and X-ray radiation.

20. The method of claim 1, further comprising agitating or stirring the reaction mixture vigorously during and after the addition of the gel-forming water insoluble polymer.

21. A high molecular mass acrylic polymer formed by the steps comprising:
   dissolving an amount of at least one initiator-modifier compound of the formula of one of EHaO, $EHaO_2$, $EHaO_3$ or $EHaO_4$, wherein E consists of one of hydrogen, an alkali metal or an alkali earth metal and Ha consists of halogen, in an aqueous solution at a starting temperature to form a reaction mixture; and
   adding a gel-forming water insoluble polymer to the reaction mixture and mixing it therewith to form macro-aggregates from the water insoluble polymer;
   and modifying the macro-aggregates by at least one of heating or irradiation to form a water-soluble high-molecular polymer.

22. The acrylic polymer of claim 21, wherein the average molecular weight of the water-soluble polymer is between $0.2 \times 10^6$ and $15 \times 10^6$ a.u.

23. The acrylic polymer of claim 21, wherein the reaction mixture further comprises a reducing agent for removing excess initiator-modifier compound.

24. The acrylic polymer of claim 21, wherein the initiator-modifier compound is selected from the group consisting of at least one of $CaOCl_2$, ozone, peroxide compounds and ammonium peroxysulphate.

25. The acrylic polymer of claim 21, wherein a concentration of an initiator-modifier compound is determined according to a concentration of active oxygen.

26. The acrylic polymer of claim 22, wherein a concentration by weight of the initiator-modifier compound is approximately between 0.05 and 20.0% of polymer mass to be modified.

27. The acrylic polymer of claim 21, wherein the water insoluble polymer is comprised of particles with a mean diameter maximum of approximately 400 μm.

28. The acrylic polymer of claim 21, wherein the steps further comprise forming an alkaline solution from an alkaline compound, wherein said alkaline compound is less than 10% per weight of the reaction solution.

29. The acrylic polymer of claim 21, wherein the water insoluble polymer to be modified is a hydrophilic superabsorbent.

30. The acrylic polymer of claim 21, wherein a concentration of the water insoluble polymer in the reaction mixture is between approximately 0.1% and 50.0% per weight of the reaction mixture.

* * * * *